3,352,831
POLYAMIDES FROM 3-AMINO-METHYL-3,5,5-TRIALKYL-1-CYCLOHEXYLAMINE
Karl Schmitt, Herne, Westphalia, and Josef Disteldorf and Günther Keller, Wanne-Eickel, Germany, assignors to Scholven - Chemie Aktiengesellschaft, Gelsenkirchen-Buer, Germany, a corporation of Germany
No Drawing. Filed Dec. 3, 1962, Ser. No. 243,182
Claims priority, application Germany, Dec. 6, 1961,
H 44,328
9 Claims. (Cl. 260—78)

It has long been known that aliphatic diamines, such as hexamethylenediamine, can be condensed with aliphatic dicarboxylic acids such as adipic acid to form polyamides of very high molecular weight having excellent properties as plastics in all fields. It is also known to condense aliphatic diamines having branched chains, such as alkyl-substituted hexamethylene diamine. The branched chain material, in contrast to the straight chain aliphatic material, does not crystallize or crystallizes very poorly and therefore is too soft, especially at somewhat higher temperatures. Furthermore, even aromatic diamines such as phenylenediamine have been used to form condensation polymers with dibasic acids, but no usable polyamides have resulted from such reactions, if for no reason other than their sensitivity to oxygen and their tendency to discolor.

Now, it has been found that diamines, more particularly 3-(aminomethyl)-3,5,5-trialkyl-1-cyclohexylamine, of the formula

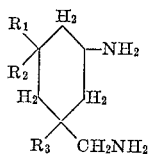

in which $R_1$, $R_2$, and $R_3$ signify identical or different alkyl (i.e., hydrocarbon alkyl) groups, preferably lower alkyl of about 1–4 carbon atoms, especially methyl groups, can be made to react with dicarboxylic acids to form new condensation products having excellent characteristics.

The special characteristics of the products obtained from these diamines are apparently to be attributed to the fact that, due to their molecular construction and their angularity, these diamines produce polyamides which cannot crystallize and therefore are entirely vitreous. On the other hand, however, due to the fairly solid and bulky form of the diamines, these products have a very high softening range extending from over 180° in the case of adipic acid condensation polymers, to more than 250° in the case of terephthalic acid polymers. The result is an immensely great surface hardness and a crystal clear transparency in these polyamides. These features, coupled with the fact that they are easily soluble in a number of solvents, e.g. known coating composition solvents, open the way to entirely new applications of which polyamides had previously been incapable, such as in paints and varnishes, surface protection, etc. The three alkyl groups linked to the cyclohexane ring furthermore bring it about that the amino group attached to the ring is considerably more firmly bonded than usually is the case with amino groups otherwise linked to the ring or to secondary carbon atoms, since the latter often easily lose the ammonia and form a double bond.

The polyamides can be made either by condensing the salt of the diamine with the dicarboxylic acid, such salt being easy to produce in the customary manner, or, as in the case, for example, of the condensation of the diamine with adipic acid, it is possible simply by heating approximately equimolecular quantities of the two products slowly in the reactor, and slowly raising the temperature to about 200°, using a vacuum to remove the water that forms.

The dicarboxylic acid can be an aliphatic dicarboxylic acid, saturated or unsaturated, and unsubstituted by groups other than alkyl groups, and having up to about 12 carbon atoms, preferably up to 10, for example about 3–10. It can also be a lower aromatic (mono-nuclear) dicarboxylic acid containing, for example, up to about 10 carbon atoms. As suitable aliphatic dicarboxylic acids can be mentioned acids such as adipic acid in the mono-, di- or tri-alkylated form, succinic acid, malonic acid, maleic acid, sebacic acid and the like, and as aromatic acids can be mentioned a dicarboxylic acid such as phthalic acid, isophthalic acid, or terephthalic acid. Hydroaromatic (i.e., cycloaliphatic) dicarboxylic acids can also be used.

By selecting the appropriate dicarboxylic acids it is possible to vary the softening point of the polyamide within the range between about 160° and 280° C. Straight-chain dicarboxylic acids such as adipic acid or sebacic acid produce the lowest softening range, and aromatics like terephthalic acid produce the highest softening range. The workability of the new polyamides is governed, of course, by their softening range. The polyamide manufactured with adipic acid corresponds in workability to the customary thermoplastics, and can easily be injection molded or extruded on any prior-art injection molding or extruding machines.

The condensation is generally performed in the temperature range between about 150 and 300° C. According to the ʄ red value the final product is to have, lower or higher temperatures are selected within this range for the condensation reaction. Higher temperatures result in higher ʄ red values, while lower temperatures have the opposite effect. In general, it is also expedient to begin the condensation at first under relatively mild conditions, and then slowly to elevate the temperature, and also the vacuum if desired, in the course of the reaction.

The diamines used as raw materials can be obtained in a simple manner. For the production of the diamines, as shown in the above structural formula, isophorone can be reacted with hydrocyanic acid to produce the corresponding γ-keto carboxylic acid nitrile, as is disclosed in U.S. patent application Ser. No. 228,514, filed Oct. 4, 1962, now U.S. Patent 3,270,044. This can then be converted with hydrogen in the presence of ammonia, to the diamine of the formula referred to and which corresponds to the starting material for the instant application, as is disclosed in U.S. patent application Ser. No. 229,206, filed Oct. 8, 1962, now abandoned in favor of continuation-in-part 382,922, filed July 15, 1964.

*Example 1*

155 g. of 3-(aminomethyl)-3,5,5-trimethyl-1-cyclohexylamine are heated to 150° C. in a glass flask with 145 g. of adipic acid. While the mixture is being slowly stirred, the water that evolves is removed from the flask by slowly increasing the vacuum. When the mixture becomes viscous, the temperature is slowly raised to 200° C., and the vacuum is raised to 0.01 mm. Hg. After about 30 hours, a very viscous mixture has developed, which upon cooling hardens to a clear, glassy, very hard, strong product which has an ʄ red value of about 1 (measured in 1% solution in formic acid). It can be cast while in the viscous condition and allowed to harden to provide an article of the properties mentioned.

*Example 2*

155 g. of the diamine of Example 1 and 166 g. of terephthalic acid are brought to reaction in alcohol and then the salt is made by precipitation with benzine. 300 grams of this salt are placed in an autoclave in about 60 cc. of water, to which small amounts of an amine such as butylamine have been added. The mixture is then heated with agitation to about 180 to 200° C. and the water is slowly evaporated away. After the water has been drawn off entirely in a vacuum, the mixture is heated for another 30 hours, approximately, at 280° C. in a high vacuum. After cooling, a very hard, glassy mass is obtained having an ƒ red value of about 1.

*Example 3*

Preparation of 3-(aminomethyl) - 3,5,5 - trimethyl-1-cyclohexylamine. In a 2-liner autoclave, 330 g. (2 mols) of 3-cyan-3,5,5-trimethylcyclohexanone (M.P. 70° C.), 300 cc. of methanol, 300 cc. of liquid ammonia and 30 g. of a previously reduced, pulverized cobalt catalyst (33% Co on kieselguhr) were placed. Hydrogen was compressed in the autoclave to 150 atmospheres overpressure, and then the autoclave was heated to 120° C. The hydrogen absorption was complete after 2 hours. After cooling, the reaction mixture was filtered off catalyst, the methanol and small quantities of water were evaporated away, and the residue was vacuum-distilled. The principal fractions were:

(1) $B.P._{18}=78-79°$ C.—2.4 wt. % $n_D^{20}=1.4742$ (imine).
(2) $B.P._{2.5}=113-113.7°$ C.—81.4 wt. % $n_D^{20}=1.48888$ (diamine).
(3) $B.P._{1.6}=135-136°$ C.—9.4 wt. % $n_D^{20}=1.4933$ (aminoalcohol).

Distillation residue—4.7 wt. percent.

In Example 1, in place of adipic acid, succinic, malonic, maleic or sebacic acid can be used, and in Example 2, phthalic acid or isophthalic acid can be used in place of terephthalic acid.

Trialkyldiamine derivatives other than the trimethyl derivative can be made in the manner that the trimethyl derivative was made (Example 3), using the appropriate trialkyl starting material.

What is claimed is:

1. A resinous condensation product of cyclohexylamine of the formula:

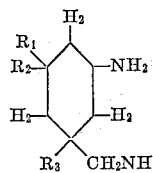

wherein $R_1$, $R_2$, and $R_3$ are each alkyl and a dicarboxylic acid, said product being an amorphous polyamide.

2. A resinous condensation product of cyclohexylamine of the formula:

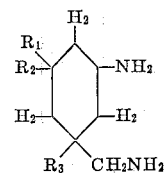

wherein $R_1$, $R_2$, and $R_3$ are each alkyl and a dicarboxylic acid having up to about 12 carbon atoms, said product being an amorphous polyamide.

3. A resinous condensation product of cyclohexylamine of the formula:

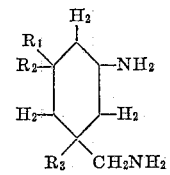

wherein $R_1$, $R_2$, and $R_3$ are each alkyl and a dicarboxylic acid selected from the group consisting of aliphatic hydrocarbon dicarboxylic acids having up to about 12 carbon atoms, and aromatic hydrocarbon dicarboxylic acids having up to about 10 carbon atoms, said product being an amorphous polyamide.

4. A resinous condensation product according to claim 1, wherein $R_1$, $R_2$, and $R_3$ are methyl.

5. A resinous condensation product according to claim 4, wherein said dicarboxylic acid is selected from the group consisting of adipic, succinic, malonic, maleic, sebacic, phthalic, isophthalic, and terephthalic.

6. The resinous condensation product according to claim 5, wherein the dicarboxylic acid is adipic.

7. The resinous condensation product according to claim 5, wherein the dicarboxylic acid is terephthalic.

8. A resinous condensation product according to claim 3, $R_1$, $R_2$, and $R_3$ each containing 1–4 carbon atoms.

9. A coating composition consisting essentially of, as film forming ingredient, a resinous condensation product according to claim 1 and a coating composition solvent, the resin being dissolved in the solvent.

References Cited

UNITED STATES PATENTS

| 2,130,523 | 9/1938 | Carothers | 260—78 |
| 2,327,131 | 8/1943 | Salzberg | 260—78 |
| 2,512,606 | 6/1950 | Bolton et al. | 260—78 |
| 3,012,994 | 12/1961 | Bell et al. | 260—78 |

FOREIGN PATENTS

| 120,252 | 8/1945 | Australia. |
| 925,496 | 3/1955 | Germany. |

WILLIAM H. SHORT, *Primary Examiner.*

H. D. ANDERSON, *Assistant Examiner.*